United States Patent
Kim et al.

(10) Patent No.: US 9,640,327 B2
(45) Date of Patent: May 2, 2017

(54) METHOD FOR IMPROVING EFFICIENCY OF ELECTROLYTE HAVING LONG TERM STABILITY AND DYE SENSITIZED SOLAR CELL FOR VEHICLE USING THE SAME

(71) Applicant: Hyundai Motor Company, Seoul (KR)

(72) Inventors: Sol Kim, Seoul (KR); In Woo Song, Yongin (KR); Yong Sung Lee, Seongnam (KR); Yong Jun Jang, Seongnam (KR); Sang Hak Kim, Seoul (KR); Moon Jung Eo, Seoul (KR); Won Jung Kim, Seoul (KR)

(73) Assignee: Hyundai Motor Company, Seoul (KR)

(*) Notice: Subject to any disclaimer, the term of this patent is extended or adjusted under 35 U.S.C. 154(b) by 107 days.

(21) Appl. No.: 14/565,825

(22) Filed: Dec. 10, 2014

(65) Prior Publication Data
US 2015/0255224 A1    Sep. 10, 2015

(30) Foreign Application Priority Data
Mar. 4, 2014 (KR) .................. 10-2014-0025647

(51) Int. Cl.
*H01G 9/20* (2006.01)

(52) U.S. Cl.
CPC ......... *H01G 9/2013* (2013.01); *H01G 9/2004* (2013.01); *H01G 9/2022* (2013.01); *H01G 9/2031* (2013.01); *Y02E 10/542* (2013.01)

(58) Field of Classification Search
CPC .................................................. H01G 9/2013
See application file for complete search history.

(56) References Cited

U.S. PATENT DOCUMENTS

| | | | |
|---|---|---|---|
| 2004/0261842 A1 | 12/2004 | Kang et al. | |
| 2014/0145105 A1* | 5/2014 | Jang ..................... | H01G 9/2013 252/62.2 |

FOREIGN PATENT DOCUMENTS

| | | |
|---|---|---|
| JP | 2004-256711 A | 9/2004 |
| KR | 10-2009-0022383 A | 3/2009 |
| KR | 10-2011-0000368 A | 1/2011 |
| KR | 10-2011-0011158 A | 2/2011 |
| KR | 10-1088675 B1 | 11/2011 |
| KR | 10-1158767 B1 | 6/2012 |
| KR | 10-2013-0084719 A | 7/2013 |
| WO | WO 2012/151618 | * 11/2012 |

* cited by examiner

*Primary Examiner* — Carol M Koslow
(74) *Attorney, Agent, or Firm* — Mintz Levin Cohn Ferris Glovsky and Popeo, P.C.; Peter F. Corless

(57) ABSTRACT

Disclosed is a nonvolatile electrolyte and a method for manufacturing a dye sensitized solar cell using the nonvolatile electrolyte. In particular, the electrolyte may maintain stability during a durability test of a solar cell module. Moreover, sealing breakage of a module occurring in the related arts may be prevented, and ion mobility may be improved thereby improving efficiency.

6 Claims, 4 Drawing Sheets

[Evaporation amount analysis for each electrolyte temperature(TGA)]

METHOD FOR IMPROVING EFFICIENCY OF ELECTROLYTE HAVING LONG TERM STABILITY AND DYE SENSITIZED SOLAR CELL FOR VEHICLE USING THE SAME

CROSS-REFERENCE TO RELATED APPLICATION

This application claims under 35 U.S.C. §119(a) the benefit of Korean Patent Application No. 10-2014-0025647 filed on Mar. 4, 2014, the entire contents of which are incorporated herein by reference.

TECHNICAL FIELD

The present invention relates to an electrolyte which may be used to improve performance and long term durability of a solar cell and a method for manufacturing a dye sensitized solar cell for a vehicle using the electrolyte of the invention.

BACKGROUND

A sunlight power generation using a solar cell is environmentally-friendly and has merits over a power generation using fossil fuel, such that air pollution or noise does not occur and an energy source, i.e. sunlight, is not depleted. Among various solar cells, a dye sensitized solar cell based on nanocrystalline porous titanium oxide ($TiO_2$) has been highlighted and studied extensively due to high energy conversion efficiency and a low manufacturing cost.

The dye sensitized solar cell which may be a third-generation solar cell has also been highlighted particularly in its low manufacturing cost which may be about one-fifth of that of the silicon solar cell in addition to high energy conversion efficiency. Further, since a transparent conductive glass substrate is used and modules having various colors may be manufactured with various dyes and electrolytes, the dye sensitized solar cell may be applied to a window of a building and the like.

The dye sensitized solar cell may be constituted with a photoelectrode including an oxide semiconductor electrode adsorbed with a dye on a surface thereof on a conductive substrate, an electrolyte capable of oxidizing and reducing reaction, and a counter electrode where a catalyst electrode is formed on a conductive substrate. When light is radiated on the dye sensitized solar cell, the dye absorbs energy of the light to generate an electron-hole pair, and the generated electron is injected into a conduction band of an oxide semiconductor. The injected electron is subsequently transported through the oxide semiconductor to a transparent electrode, and moves through an external circuit when the photoelectrode and the counter electrode are connected, thereby generating an electric current. The electron-hole generated in the dye receives electrons from the electrolyte which is capable of oxidizing and reducing and is reduced back, thereby restoring the dye sensitized solar cell and completing an electric circuit of the dye sensitized solar cell. In this case, the counter electrode may provide the electron moving through the external circuit, thereby triggering an oxidation-reduction reaction of ions in the electrolyte. Since the electron to the electrolyte needs to be efficiently transferred, the counter electrode typically has a structure where the conductive substrate is coated with the catalyst. In addition, the catalyst may require substantial level of catalytic activity, increased surface area and elevated electrical or ion conductivity to thereby have a minimal electrical resistance at interface with the electrolyte and further require long-term stability in the electrolyte. Moreover, the electrolyte used in the dye sensitized solar cell may have an elevated boiling point to simultaneously obtain substantial durability and improved ionic conductivity affecting efficiency.

In the related arts, compositions used as the electrolyte of the dye sensitized solar cell have been described as follows.

For example, an electrolyte for a dye sensitized solar cell has been reported and the electrolyte includes an imidazole-based oligomer type ionic liquid N-(3-(1-methylimidazolium)propyl)hexanamide iodide (NMIPHI), the imidazole-based oligomer type ionic liquid has N-alkylimidazolium propylhexanamide iodide as a basic structure and includes an iodine ion ($I^-$) that is an inorganic anion. The electrolyte may be present in a solid or liquid state according to substitution of a reaction group of an organic cation, and the electrolyte is manufactured by adding iodine, 4-tert-butylpyridine (TBP), and 3-methoxypropionitrile (MPN) to the ionic liquid (e. g. Korean Patent Application Laid-Open No. 2013-0084719).

Also provided in the related arts is an electrolyte for a solar cell, which includes a complex salt of imidazole and C1-C20 diiodoalkane, and a cation of a complex of imidazole and C1-C20 diiodoalkane and iodine ions ($I^-/I_3^-$) generated from iodine ($I_2$), and a solar cell using the electrolyte has also been developed. The electrolyte further includes 1 to 10 parts by weight of a nonvolatile organic solvent such as acetonitrile, gamma-butyrolactone, and 3-methoxypropionitrile in addition to the aforementioned electrolyte (e.g. Korean Patent Application Laid-Open No. 2009-0022383).

In other example in the related art, an imidazole-based polymer type or oligomer type ion solution has been developed. The ion solution includes an iodine ion ($I^-$) and 1 to 25 ethylene oxide monomers and has a structure of the ethylene oxide monomers and urethane in which urea is connected to the ethylene oxide monomers and an imidazolium structure at an end thereof. The electrolyte for a dye sensitized solar cell, which includes an organic solvent selected from acetonitrile, 3-methoxypropionitrile, gamma-butyrolactone, ethylene glycol, and the like in addition to the aforementioned ion solution has also been disclosed (e.g. Korean Patent Application Laid-Open No. 2011-0011158).

In addition, a dye sensitized solar cell including an imidazolium-based liquid type electrolyte has been reported. The imidazolium-based liquid type electrolyte may be in a liquid state at room temperature and elevated temperatures and having excellent thermal stability and temperature stability without using an organic solvent in an electrolyte. Thus, the dye sensitized solar cell including a semiconductor electrode; a counter electrode; and a 1,3-vinylalkylimidazolium iodide-based electrolyte interposed between the semiconductor electrode and the counter electrode has been provided (e.g. US Patent Publication No. 2004-0261842).

In another example of the related arts, an electrolyte solution for a dye sensitized solar cell has been developed. The electrolyte includes an organic solvent; an oxidation-reduction derivative; a pyrrolidinium iodide-based ionic liquid selected from the group consisting of 1-butyl-1-methylpyrrolidinium iodide, 1-methyl-1-propylpyrrolidinium iodide (MPPyI) and 1-ethyl-1-methylpyrrolidinium iodide; and t-butylpyridine as an additive, in which the organic solvent is one kind or more mixture solutions selected from ethylene carbonate, 3-methoxypropionitrile, gamma-butyrolactone, diethyl carbonate, and the like (e.g. Korean Patent No. 10-1088676).

Meanwhile, a polymer particle dispersing element, an electrolyte, and a cell have been provided and the electrolyte includes a polymer particle dispersing element containing polymer particles and an ionic liquid in which the polymer particles are monomer components and include methyl (metha)acrylate, isobutyl (metha)acrylate, cyclohexyl (metha)acrylate, and the like, and the ionic liquid includes 1-ethyl-3-vinylimidazolium or 1-methyl-3-ethylimidazolium iodide (e.g. Japanese Patent Application Laid-Open No. 2004-256711).

In some other related documents in the related arts, an electrolyte for a dye sensitized solar cell has been proposed. The electrolyte includes the imidazole-based oligomer type ionic liquid N-(3-(1-methylimidazolium)propyl)hexanamide iodide (NMIPHI) and a 3-methoxypropionitrile solvent. In addition, the solar cell includes the electrolyte including the complex salt of imidazole and C1-C20 diiodoalkane, and a cation of the complex salt and iodine ions ($I^-/I_3^-$) generated from iodine ($I_2$), and further includes the nonvolatile solvent such as acetonitrile. Moreover, the electrolyte for the solar cell has been proposed to include the imidazole-based polymer type or oligomer type ion solution including the iodine ion ($I^-$) and 1 to 25 ethylene oxide monomers, and the organic solvent such as acetonitrile, and to include the imidazole-based compound and solvent. However, the electrolyte in such dye sensitized solar cell does not include the imidazolium-based compound such as 1-propyl-3-methylimidazolium iodide or the pyridinium-based compound as the ionic liquid, and thus stability may be significantly reduced (e.g. Korean Patent Application Laid-Open No. 2013-0084719; Korean Patent Application Laid-Open No. 2009-0022383; Korean Patent Application Laid-Open No. 2011-0011158).

Moreover, in other related documents, the dye sensitized solar cell including the 1,3-vinylalkylimidazolium iodide-based electrolyte has been disclosed. The electrolyte solution for the dye sensitized solar cell includes the organic solvent; the oxidation-reduction derivative; the pyrrolidinium iodide-based ionic liquid; and the additive. Further, the electrolyte includes the polymer particle dispersing element containing the polymer particles and the ionic liquid, but does not include the ionic liquid and the low viscosity liquid solvent, and thus performance may deteriorate. (e.g. US Patent Publication No. 2004-0261842; Korean Patent No. 10-1088676; Japanese Patent Application Laid-Open No. 2004-256711).

The above described conventional technologies in the related arts have been focused on preventing liquid leakage or volatilization of the electrolyte for the solar cell by simply using a general ionic liquid and maintaining stability thereof. However, particular solution has not been provided for an optimum composition of the electrolyte using the low viscosity solvent as the additive in the ionic liquid electrolyte, an efficiency improvement effect, and maintenance of endurance stability.

In particular, in order to apply a dye sensitized solar cell to vehicles, long term stability in an actual vehicle environment in a temperature range of about −40 to 85° C. may be required by using a high durability material which stably maintains performance even in a severe outdoor environment.

However, in the current technologies in the related arts using low boiling point liquid electrolyte, although efficiency may be improved, temperature durability may be inferior in the actual vehicle environment due to a low boiling point and flowability, and thus such liquid electrolyte may not be used for a vehicle. Meanwhile, when the electrolyte has improved durability and a viscosity greater than that of a liquid solvent, ion mobility may be reduced, and thus that solar energy conversion efficiency may be reduced low as compared to the liquid electrolyte.

Accordingly, in order to develop a dye sensitized solar cell for a vehicle, a novel electrolyte which satisfies both durability in a severe vehicle evaluation condition and improved efficiency is desired.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides technical solutions to the above mentioned technical difficulties and needs for a novel electrolyte which simultaneously provides durability in a severe evaluation condition of a vehicle and improved efficiency. Accordingly, the present invention relates to a nonvolatile ionic liquid-based electrolyte and a method for manufacturing a dye sensitized solar cell using the same.

In one aspect, an electrolyte for a dye sensitized solar cell is provided. The electrolyte may include: a nonvolatile ionic liquid; and a low viscosity liquid solvent having a viscosity of about 10 cp or less. In particular, the low viscosity liquid solvent may be added to the nonvolatile ionic liquid in an amount of about 1 to 10 wt % based on the total weight of the nonvolatile ionic liquid.

In certain exemplary embodiments, the electrolyte may maintain stability during a durability test of a solar cell module. In addition, module sealing breakage may not occur with the electrolyte of the invention unlike an existing liquid electrolyte, and improved ion mobility may be obtained to thereby improve efficiency.

In other certain exemplary embodiments of the present invention, a boiling point of the electrolyte may be elevated to about 300° C. or greater by using an ionic liquid, and performance of the solar cell may be improved by using a liquid solvent as an additive at a predetermined ratio as compared to the conventional solar cell using the electrolyte without the liquid solvent. Further, sealing stability may maintain by controlling a vapor pressure of the liquid solvent which may be added to have an optimized composition at elevated temperatures.

Accordingly, according to various exemplary embodiments of the present invention, when the electrolyte for the dye sensitized solar cell including a low viscosity liquid solvent such as acetonitrile, 3-methoxypropionitrile, or butyrolactone as the additive is added to the ionic liquid including an imidazolium-based compound or a pyridinium-based compound, the dye sensitized solar cell may maintain durability and conversion efficiency even in a severe vehicle environment.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
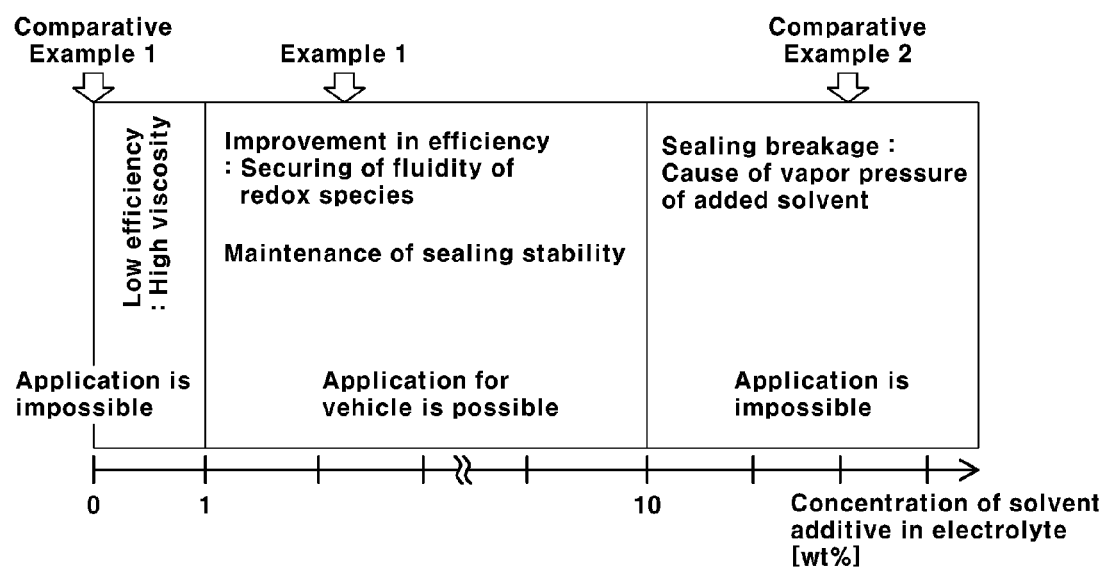
FIG. 1 illustrates an exemplary optimum content of an exemplary liquid solvent additive added to an exemplary electrolyte for an exemplary dye sensitized solar cell according to an exemplary embodiment of the present invention.
Figure 2:
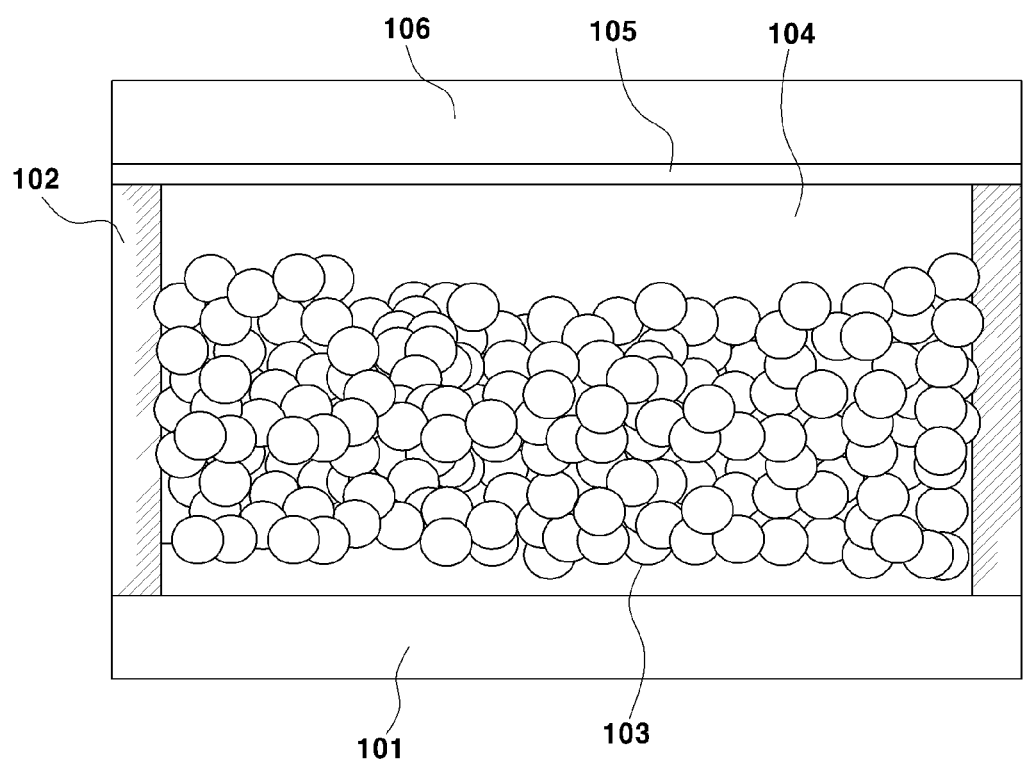
FIG. 2 illustrates a cross-sectional view of an exemplary structure of an exemplary dye sensitized solar cell manufactured according to an exemplary embodiment of the present invention.

Reference numerals set forth in the Drawings includes reference to the following elements as further discussed below:

101: First substrate
102: UV curing agent
103: Inorganic oxide layer
104: Ionic liquid electrolyte layer
105: Counter electrode layer
106: Second substrate It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In one aspect, disclosed is an electrolyte for a dye sensitized solar cell, which may improve ion mobility, durability and performance. In an exemplary embodiment, the electrolyte may include: an nonvolatile ionic liquid; and a low viscosity liquid solvent having a viscosity of about 10 cp or less. In particular, the low viscosity liquid solvent may be added in an amount of about 1 to 10 wt % to the nonvolatile ionic liquid which have improved durability.

In certain exemplary embodiments, the nonvolatile ionic liquid including the low viscosity liquid solvent may be, but not limited to, one or more of an imidazolium-based compound, a pyridinium-based compound or combinations thereof. The imidazolium-based compound, as used herein, may be one or more selected from the group consisting of: 1-propyl-3-methylimidazolium iodide, 1-butyl-3-methylimidazolium iodide, 1-hexyl-3-methylimidazolium iodide, 1-hexyl-2,3-dimethylimidazolium iodide, 1-ethyl-3-methylimidazolium bis(trifluoromethanesulfonyl)imide, 1-ethyl-3-methylimidazolium dicyanamide, 1-ethyl-3-methylimidazolium tetrafluoroborate, 1-ethyl-3-methylimidazolium thiocyanate, and 1-ethyl-3-methylimidazolium selenocyanate. Alternatively, the ionic liquid may be, but not limited to, a pyridinium-based compound. The pyridinium-based compound may be selected from the group consisting of: 1-butylpyridinium iodide, 1-hexylpyridinium iodide, and combinations thereof.

In certain exemplary embodiments, the low viscosity liquid solvent may have a viscosity of about 10 cp or less. In yet certain exemplary embodiments, the low viscosity liquid solvent may be, but not limited to, acetonitrile, 3-methoxypropionitrile, or mixtures thereof which is particularly suitable for the electrolyte for the dye sensitized solar cell of a vehicle. In still certain exemplary embodiments, a content of the low viscosity liquid solvent may be in an amount of about 1.0 to 10 wt % based on the total weight of the ionic liquid.

When the content of the low viscosity liquid solvent is less than about 1.0 wt %, improvement of mobility of redox species in the ionic liquid may not be sufficiently obtained and such electrolyte may not be used due to a reduction in solar cell efficiency. When the content of the low viscosity liquid solvent is greater than about 10 wt %, the liquid solvent may vaporize and cell sealing of a solar cell may be broken by the generated vapor pressure when the electrolyte is used in a vehicle environment.

In certain exemplary embodiments, the electrolyte may include additives to the ionic liquid electrolyte. The additive may be, but not limited to, LiI, NaI, KI, LiBr, NaBr, KBr, GuSCN, pyridine, a tert-butyl pyridine mixture, or the like. In yet certain exemplary embodiments, the additive may be used singly or in combination as a mixture form. The content of the additive may be included in an amount of about 1 wt % to 10 wt % based on the total weight of the ionic liquid in consideration of an efficiency improvement effect and solubility.

EXAMPLES

The following examples illustrate the invention and are not intended to limit the same.

Hereinafter, the process for manufacturing the dye sensitized solar cell manufactured according to various Examples of the present invention will be described below, but does not construe the scope of the present invention.

The nonvolatile ionic liquid in the following Example may be 1-butyl-3-methylimidazolium iodide and ionic liquid species as the equivalent material included in the present invention.

Example 1

Manufacturing of an Exemplary Ionic Liquid Electrolyte Including an Amount of about 1 to 10 Parts by Weight of the Liquid Solvent A mixed solution was prepared by adding about 90 parts by weight of the ionic liquid, about 4 parts by weight of tert-butyl pyridine, and about 3 parts by weight of GuSCN and agitated for about 1 hour. Subsequently, about 3 parts by weight of iodine was added into the mixed solution and agitated for about 1 hour. Then, about 3 parts by weight of the low viscosity liquid solvent was further added and agitated for about 24 hours. The low viscosity liquid solvent may have a viscosity of about 10 cp or less and examples thereof may be acetonitrile and 3-methoxypropionitrile, or the mixture thereof.

Comparative Example 1

Manufacturing of the Ionic Liquid Electrolyte without the Low Viscosity Liquid Solvent A mixed solution was prepared by adding about 90 parts by weight of the ionic liquid, about 4 parts by weight of tert-butyl pyridine, and about 3 parts by weight of GuSCN and agitated for about 1 hour. Subsequently, about 3 parts by weight of iodine was added into the mixed solution and agitated for 1 hour.

Comparative Example 2

Manufacturing of the Ionic Liquid Electrolyte Including an Amount of about 10 Parts by Weight or Greater of the Low Viscosity Liquid Solvent A mixed solution was prepared by adding about 90 parts by weight of the ionic liquid, about 4 parts by weight of tert-butyl pyridine, and about 3 parts by weight of GuSCN and agitated for about 1 hour. Subsequently, about 3 parts by weight of iodine was added into the mixed solution and agitated for 1 hour. Then, about 12 parts by weight or greater of the low viscosity liquid solvent was further added, and then agitated for about 24 hours. The low viscosity liquid solvent may have a viscosity of about 10 cp or less and examples thereof may be acetonitrile and 3-methoxypropionitrile, or the mixture thereof.

Preparation Example

Preparation of the Solar Cell

A titanium dioxide paste (Solaronix S.A.) was applied on a fluorine doped tin oxide (FTO) substrate by screen printing. The coated substrate was fired at a temperature of about 500° C. for about 30 minutes. A dye (Solaronix S.A., N719) was adsorbed on the manufactured titanium dioxide photoelectrode at a conventional temperature for about 24 hours. Subsequently, a UV curing agent was applied to the outskirt of the photoelectrode on which the dye was adsorbed, and the counter electrode substrate that was coated with platinum and sintered was put thereon, and curing was performed by using UV curing equipment. After the electrolytes of Example 1 and Comparative Examples 1 and 2 were injected into the prepared cells, the inlets thereof were sealed by the same UV curing agent to compare performances of the cells.

The prepared solar cells including electrolytes of Example 1 and Comparative Examples 1-2 are compared as shown in Table 1. As shown below, the low viscosity liquid solvent is added according to an exemplary embodiment of the present invention, efficiency of the cell may be improved.

TABLE 1

| Sample | Jsc (mA/cm$^2$) | Voc (V) | Fill factor | Energy conversion efficiency (%) |
|---|---|---|---|---|
| Comparative Example 1 | 9.5 | 0.55 | 0.52 | 2.71 |
| Example 1 | 13.4 | 0.61 | 0.61 | 5.00 |

Figure 3:
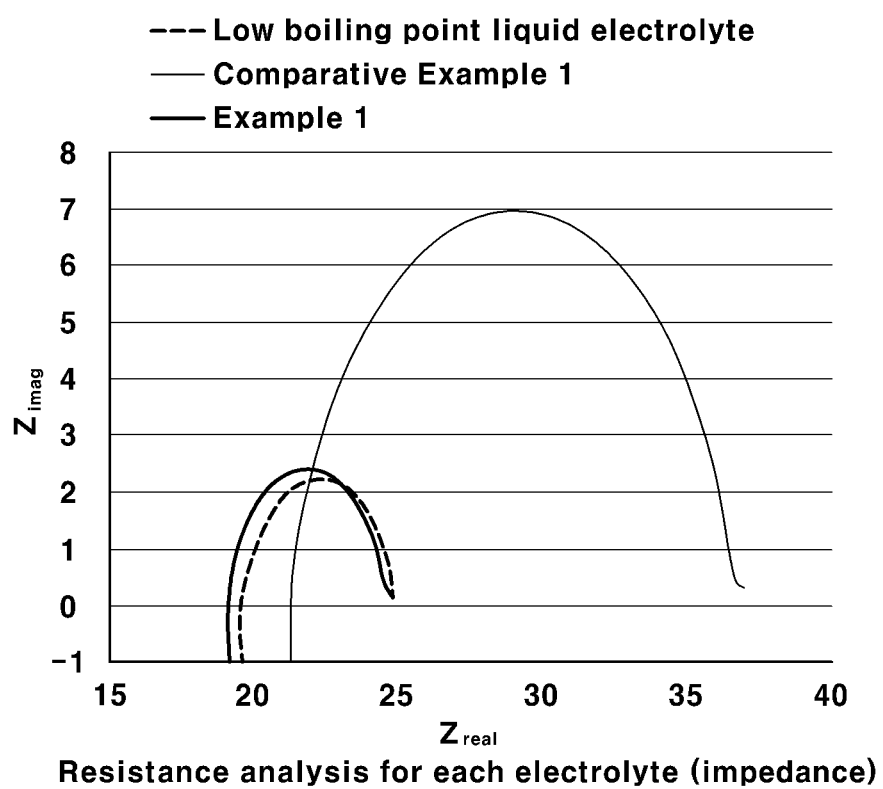
FIG. 3 shows an exemplary impedance analysis result obtained from Example 1 and Comparative Example 1 according to an exemplary embodiment of the present invention. As shown herein, the electrolyte in Example 1 may have resistance that of a liquid electrolyte having substantial ion mobility.

In addition, as shown in FIG. 3, ion mobility in the electrolyte to which the liquid solvent according to an exemplary embodiment of the present invention may be improved. Particularly, the ion mobility of the electrolyte of the present invention may be improved through a reduction in resistance value to the resistance value at a level that is similar to that of the low viscosity liquid electrolyte when an amount of about 1.0 to 10 parts by weight of the liquid solvent additive in Example 1 is added to the ionic liquid electrolyte having the high resistance characteristic of the high viscosity.

Figure 4:
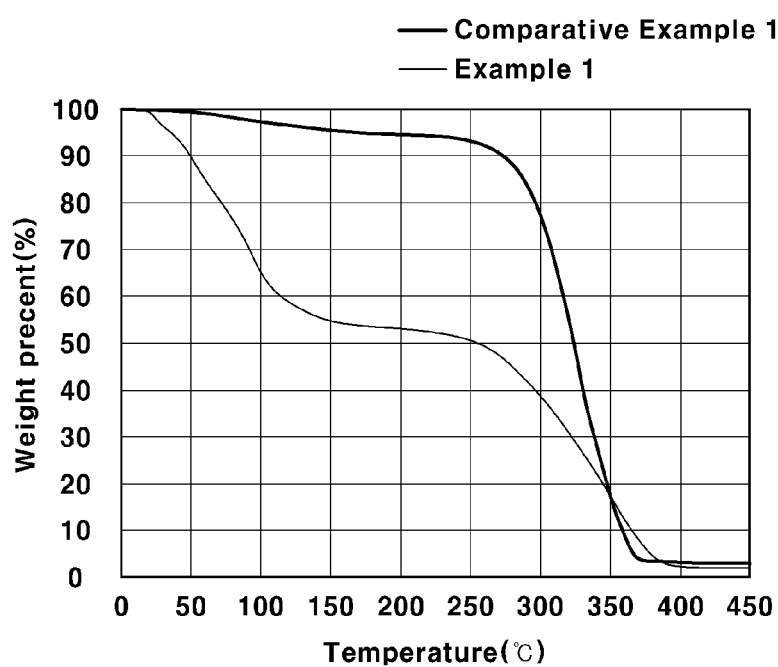
FIG. 4 shows an exemplary thermogravimetric analysis result obtained from Example 1 and Comparative Example 1 according to an exemplary embodiment of the present invention. As shown herein, an evaporation amount of the electrolyte in Example 1 may be improved.

Accordingly, the vapor pressure of the electrolyte including the low viscosity liquid solvent may be controlled as shown in FIG. 4.

Meanwhile, when the content of the low viscosity liquid solvent is included in an amount of about 10 wt % or greater, the photoelectric efficiency may be readily reduced due to sealing breakage during the accelerated durability evaluation as shown in Table 2 and FIG. 1.

TABLE 2

| Sample | Energy conversion efficiency before accelerated durability evaluation (%) | Energy conversion efficiency after accelerated durability evaluation (%) |
|---|---|---|
| Example 1 | 5.00 | 4.40 |
| Comparative Example 2 | 2.71 | 0.31 |

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An electrolyte for a dye sensitized solar cell, comprising:
a nonvolatile ionic liquid;
a low viscosity liquid solvent having a viscosity of about 10 cp or less,
wherein the low viscosity liquid solvent is added in an amount of about 1 to 10 wt % to the nonvolatile ionic liquid based on the total weight of the nonvolatile ionic liquid, and
wherein the electrolyte further comprises one or more selected from the group consisting of LiI, NaI, KI, LiBr, NaBr, KBr, GuSCN, pyridine, and tert-butyl pyridine.

2. The electrolyte of claim 1, wherein the nonvolatile ionic liquid is one or more of an imidazolium-based compound, a pyridinium-based compound or combinations thereof.

3. The electrolyte of claim 2, wherein the imidazolium-based compound are selected from the group consisting of 1-propyl-3-methylimidazolium iodide, 1-butyl-3-methylimidazolium iodide, 1-hexyl-3-methylimidazolium iodide, 1-hexyl-2,3-dimethylimidazolium iodide, 1-ethyl-3-methylimidazolium bis(trifluoromethanesulfonyl)imide, 1-ethyl-3-methylimidazolium dicyanamide, 1-ethyl-3-methylimidazolium tetrafluoroborate, 1-ethyl-3-methylimidazolium thiocyanate, and 1-ethyl-3-methylimidazolium selenocyanate.

4. The electrolyte of claim 2, wherein the pyridinium-based compound is selected from the group consisting of 1-butylpyridinium iodide and 1-hexylpyridinium iodide.

5. The electrolyte of claim 1, wherein the low viscosity liquid solvent having the viscosity of 10 cp or less is selected from the group consisting of acetonitrile, 3-methoxypropionitrile, and combinations thereof.

6. A dye sensitized solar cell comprising:
the electrolyte of claim 1.

* * * * *